United States Patent
Vejalla et al.

(10) Patent No.: US 11,715,338 B2
(45) Date of Patent: Aug. 1, 2023

(54) RANKING FAULT CONDITIONS

(71) Applicant: Ford Global Technologies, LLC, Dearborn, MI (US)

(72) Inventors: Dhanunjay Vejalla, Novi, MI (US); David A. Symanow, Plymouth, MI (US); Ray Siciak, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 375 days.

(21) Appl. No.: 17/146,714

(22) Filed: Jan. 12, 2021

(65) Prior Publication Data
US 2022/0222983 A1 Jul. 14, 2022

(51) Int. Cl.
| | |
|---|---|
| G07C 5/00 | (2006.01) |
| G07C 5/08 | (2006.01) |
| G01C 21/36 | (2006.01) |
| G06N 3/08 | (2023.01) |
| G06F 18/214 | (2023.01) |
| G06F 18/2113 | (2023.01) |
| G06F 18/2415 | (2023.01) |
| B60W 60/00 | (2020.01) |

(52) U.S. Cl.
CPC ....... *G07C 5/0816* (2013.01); *G01C 21/3691* (2013.01); *G06F 18/214* (2023.01); *G06F 18/2113* (2023.01); *G06F 18/2415* (2023.01); *G06N 3/08* (2013.01); *B60W 60/001* (2020.02)

(58) Field of Classification Search
CPC ............. G06F 18/2113; G06F 18/214; G06F 18/2415; G01C 21/3691; G06N 3/08; B60W 60/001
See application file for complete search history.

(56) References Cited

U.S. PATENT DOCUMENTS

| | | | |
|---|---|---|---|
| 8,370,018 B2 * | 2/2013 | Andreasen | G01M 17/00 701/31.6 |
| 9,573,492 B2 | 2/2017 | Bell et al. | |
| 2007/0073518 A1 * | 3/2007 | Harrison | G21C 17/00 702/183 |
| 2017/0024937 A1 * | 1/2017 | Ramesh | G07C 5/008 |

(Continued)

FOREIGN PATENT DOCUMENTS

| | | | | |
|---|---|---|---|---|
| CN | 111414477 A | | 7/2020 | |
| CN | 115688093 A | * | 7/2022 | G06F 15/78 |

(Continued)

OTHER PUBLICATIONS

S. Kher, "Automotible Engine Fault Diagnosis Using Neural Network", 2001 (Year: 2001).*

*Primary Examiner* — Elaine Gort
*Assistant Examiner* — Brittany Renee Peko
(74) *Attorney, Agent, or Firm* — Brandon Hicks; Bejin Bieneman PLC

(57) ABSTRACT

A plurality of fault conditions are detected on a communication network onboard a vehicle. The detected fault conditions, a fault condition importance, environment conditions, and a vehicle operation mode are input to a neural network that outputs rankings for respective detected fault conditions. The neural network is trained by determining a loss function based on a maximum likelihood principle that determines a probability distribution that ranks the detected fault conditions. The vehicle is operated based on the rankings of the fault conditions.

20 Claims, 3 Drawing Sheets

(56) References Cited

U.S. PATENT DOCUMENTS

| | | | |
|---|---|---|---|
| 2020/0051347 A1* | 2/2020 | Bohl .................... | G07C 5/0816 |
| 2021/0049377 A1* | 2/2021 | Hu ..................... | G06K 9/00805 |
| 2022/0084335 A1* | 3/2022 | Tang ................... | G07C 5/0808 |
| 2022/0101666 A1* | 3/2022 | Simonis ............... | G07C 5/0816 |
| 2022/0382262 A1* | 12/2022 | Arthur ............. | G05B 19/41875 |

FOREIGN PATENT DOCUMENTS

| | | |
|---|---|---|
| EP | 2803048 B1 | 8/2020 |
| WO | 2019109915 A1 | 6/2019 |

* cited by examiner

RANKING FAULT CONDITIONS

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
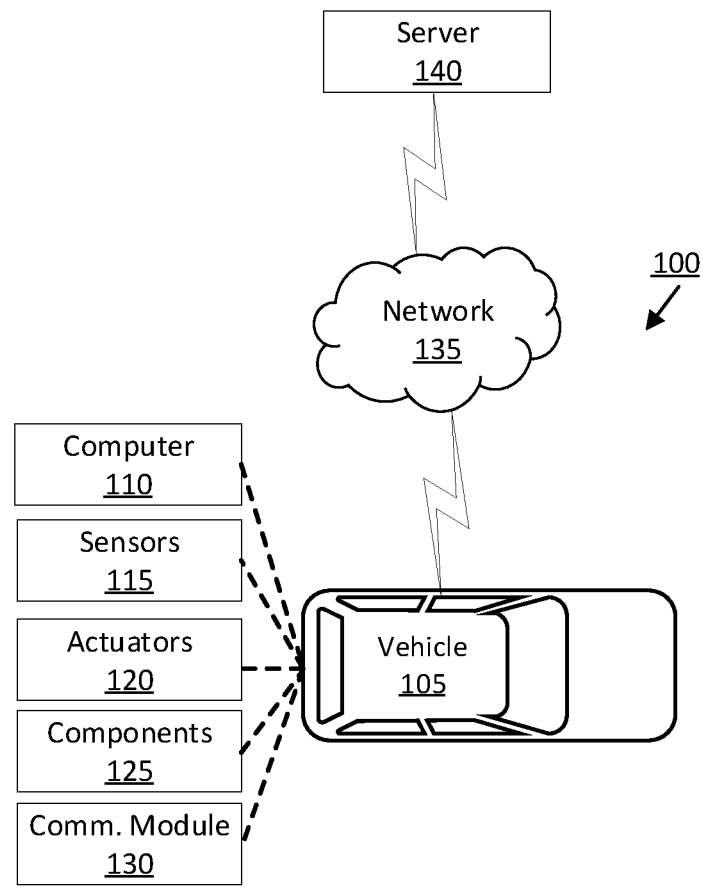
FIG. 1 is a block diagram illustrating an example vehicle control system for a vehicle.

A system includes a computer including a processor and a memory, the memory storing instructions executable by the processor to detect, on a communication network onboard a vehicle, a plurality of fault conditions. The instructions further include instructions to input the detected fault conditions, a fault condition importance, environment conditions, and a vehicle operation mode to a neural network that outputs rankings for respective detected fault conditions. The neural network is trained by determining a loss function based on a maximum likelihood principle that determines a probability distribution that ranks the detected fault conditions. The instructions further include instructions to operate the vehicle based on the rankings of the fault conditions.

Environment conditions can include at least one of road data or weather data.

The fault condition importance can be determined based on an amount of time the vehicle is permitted to operate after detecting corresponding fault conditions.

The neural network can include first hidden layers that output latent variables to second hidden layers that output rankings for the detected fault conditions.

The first hidden layers can include bias neurons.

The neural network can optimize parameters of the loss function by applying gradient descent to the loss function.

The instructions can further include instructions to operate the vehicle based further on identifying a highest ranked fault condition as one of persistent or transient.

The instructions can further include instructions to, upon determining an amount of time between detecting the fault conditions and receiving the output from the neural network is greater than or equal to a predetermined time, monitor the communications network onboard the vehicle for updated fault conditions and maintain operation of the vehicle.

The instructions can further include instructions to, upon detecting updated fault conditions, input the updated fault conditions into the neural network that outputs a ranking for the updated fault condition.

The instructions can further include instructions to operate the vehicle based further on determining an amount of time between detecting the fault conditions and receiving the output from the neural network is less than a predetermined time.

The instructions can further include instructions to determine the vehicle operation mode based on vehicle sensor data.

The instructions can further include instructions to determine the environment conditions based on vehicle sensor data.

The instructions can further include instructions to access a look-up table to determine the fault condition importance.

The instructions can further include instructions to, based on identifying a highest ranked fault condition, one of maintain operation of the vehicle or perform a minimal risk maneuver.

A method includes detecting, on a communication network onboard a vehicle, a plurality of fault conditions. The method further includes inputting the detected fault conditions, a fault condition importance, environment conditions, and a vehicle operation mode to a neural network that outputs rankings for respective detected fault conditions. The neural network is trained by determining a loss function based on a maximum likelihood principle that determines a probability distribution that ranks the detected fault conditions. The method further includes operating the vehicle based on the rankings of the fault conditions.

The neural network can optimize parameters of the loss function by applying gradient descent to the loss function.

The method can further include operating the vehicle based further on determining an amount of time between detecting the fault conditions and receiving the output from the neural network is less than a predetermined time.

The method can further include, based on identifying a highest ranked fault condition, one of maintaining operation of the vehicle or performing a minimal risk maneuver.

The method can further include operating the vehicle based further on identifying a highest ranked fault condition as one of persistent or transient.

The fault condition importance can be determined based on an amount of time the vehicle is permitted to operate after detecting corresponding fault conditions.

Further disclosed herein is a computing device programmed to execute any of the above method steps. Yet further disclosed herein is a computer program product, including a computer readable medium storing instructions executable by a computer processor, to execute an of the above method steps.

A vehicle computer can detect a plurality of fault conditions associated with one or more vehicle components. The fault conditions may have differing levels of severity. For example, some fault conditions may indicate that operation of the vehicle component is impaired, and other fault conditions may indicate that maintenance is needed. However, the severity of each fault condition can depend upon one or more factors, including environmental conditions, a vehicle operation mode, etc. For example, a fault condition associated with a brake component may have a lower severity when the vehicle is in an ignition-on mode as compared to when the vehicle is in an autonomous driving mode. The vehicle computer may, for example, lack computational resources to prioritize detected fault conditions within an amount of time to operate the vehicle, such that the vehicle computer may operate the vehicle based on an order in which fault conditions are detected. As another example, the vehicle computer may lack computational resources to operate the vehicle based on the detected fault conditions when a number of detected fault conditions exceeds a threshold.

Advantageously, the vehicle computer can input the detected fault conditions and additional factors, including environmental conditions, a vehicle operation mode, etc., into a neural network trained to rank the detected fault conditions. Obtaining the rankings of the detected fault conditions from the neural network can reduce computation time and resources, which can allow the vehicle computer to operate the vehicle based on the rankings of the fault conditions.

With reference to the Figures, an example vehicle control system 100 includes a vehicle 105. A vehicle computer 110 in the vehicle 105 receives data from sensors 115. The vehicle computer 110 is programmed to detect, on a communication network onboard a vehicle, a plurality of fault conditions. The vehicle computer 110 is further programmed to input the detected fault conditions, a fault condition importance, environment conditions, and a vehicle operation mode to a neural network that outputs rankings for respective detected fault conditions. The neural network is trained by determining a loss function based on a maximum likelihood principle that determines a probability distribution that ranks the detected fault conditions. The vehicle computer 110 is further programmed to operate the vehicle based on the rankings of the fault conditions.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device 145, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/ or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The vehicle computer 110 may be programmed to obtain environment conditions around the vehicle 105. Environment conditions are a subset of data, specifically data providing measurements of phenomena outside a vehicle, i.e., in an environment around the vehicle, that is collected about operation of one or more vehicle 105 subsystems and/or components 125; vehicle environment conditions can include object data, road data, and weather data.

The vehicle computer 110 can receive sensor 115 data, e.g., image data, of the environment around the vehicle 105. The image data can include one or more objects around the host vehicle 105. For example, object classification or identification techniques, can be used, e.g., in the vehicle computer 110 based on lidar sensor 115, camera sensor 115, etc., data to identify a type of object, e.g., a vehicle, a bicycle, a drone, a pedestrian, etc., as well as physical features of objects.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification and/or a classification (i.e., movable or non-movable) of one or more objects or an indication that no object is present in the respective region of interest. Further, a coordinate system (e.g., polar or cartesian) applied to an area proximate to the vehicle 105 can be used to specify locations and/or areas (e.g., according to the vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

The vehicle computer 110 may, for example, identify a current road of vehicle 105 operation based on map data. A road in the present context is an area of ground surface that includes any surface provided for land vehicle travel. A road is defined with boundaries, e.g., by geo-fencing. The vehicle computer 110 may receive the map data from the remote server computer 140, e.g., via the network 135. In such an example, the geo-fence specifies a perimeter of the road according to geo-coordinates, e.g., such as are used in the Global Positioning System (GPS) that specify lines defining boundaries, i.e., the perimeter, of the road. The vehicle computer 110 can then determine the vehicle 105 is on the road based on the location data of the vehicle 105 indicating the vehicle 105 is within the geo-fence.

Upon identifying the current road of vehicle 105 operation, the vehicle computer 110 may determine one or more characteristics of the current road, i.e., physical quantities that describe measurements and/or limitations of the road. For example, road characteristics can include a curvature, an inclination, a speed limit, number of lanes, etc. The vehicle computer 110 can, for example, determine the road characteristics based on the map data. The vehicle computer 110 can then determine a type of the current road based on the characteristics of the current road. A type of road is a classification of the road that describes expected vehicle use of the road. Each type of road is further defined by a plurality of predefined characteristics. A road type can be identified by an identifier that describes the road type. Non-limiting examples of types of roads include: highways, freeways, expressways, service drives, side streets, off-ramps, on-ramps. The plurality of predefined characteristics for each type of road may be specified, e.g., by government regulations.

The vehicle computer 110 may determine the weather data for the vehicle 105 location based on sensor 115 data. For example, the vehicle computer 110 can analyze image data, e.g., using image processing techniques, to determine the weather data for the vehicle 105 location, e.g., a presence or absence and/or type of precipitation, e.g., rain, snow, fog, etc. As another example, the vehicle computer 110 can receive data from e.g., a precipitation sensor 115, an ambient temperature sensor 115, a humidity sensor 115, etc., indicating weather data for the vehicle 105 location. A precipitation sensor 115 can be any sensor suitable to detect precipitation. For example, the precipitation sensor 115 may include an LED bulb, a light sensor, and possibly a prism reflecting light from the LED bulb to the light sensor; the presence of water scatters some of the light, reducing the light received by the light sensor by a known amount. As yet another example, the vehicle computer 110 can receive weather data from an external server, e.g., from a weather station, the remote server computer 140, etc. The weather data typically includes conventional measurements, e.g., ambient air temperature, ambient humidity, precipitation data, forecasts, wind speed, etc. That is, the weather data may specify a wind speed and a wind direction in addition to other physical phenomenon in an ambient environment, e.g., an air temperature, an amount of ambient light, a presence or absence of precipitation, a type of precipitation (e.g., snow, rain, etc.), an amount of precipitation (e.g., a volume or depth of precipitation being received per unit of time, e.g., amount of rain per minute or hour), presence or absence of atmospheric occlusions that can affect visibility, e.g., fog, smoke, dust, smog, a level of visibility (e.g., on a scale of 0 to 1, 0 being no visibility and 1 being unoccluded visibility), etc.

The vehicle computer 110 is programmed to operate the host vehicle 105 based on an operation mode. That is, the first computer 110 may actuate one or more host vehicle components 125 based on the operation mode. An operation mode is a set of specified operating parameters, i.e., a measurable set of physical parameters, for one or more vehicle components 125, such as a braking, steering, propulsion, etc. For example, the operation mode may be a suspension operation mode. In the suspension operation mode, the vehicle computer 110 is programmed to actuate one or more suspension components 125 to suspension operating parameters, e.g., a camber angle, a stiffness, a ride height, etc., associated with the suspension operation mode. Other non-limiting examples of operation modes include "Sport mode," "Track mode," "Eco mode," "Comfort mode," "Aero mode," "Park mode," etc. The vehicle computer 110 can, for example, receive a user input, e.g., via a human-machine interface such as a touchscreen, a button, a lever, a rotating dial, etc., specifying an operation mode. That is, a user of the vehicle 105 may be able to select the operation mode, e.g., to adjust one or more parameters of the vehicle 105. The vehicle computer 110 may be programmed to predict a future operation mode of the vehicle 105. A future operation mode is an operation mode that the vehicle 105 is expected to operate in at a future time. For example, the vehicle computer 110 can store, e.g., in a memory of the vehicle computer 110, previous user inputs selecting corresponding vehicle operation modes at various vehicle 105 locations. The vehicle computer 110 can then analyze a planned path of the vehicle 105 and predict the future vehicle operation mode based on the previous user inputs. For example, the vehicle computer 110 can compare the planned path to a map to determine whether the planned path intersects one of various locations specified, e.g., as geo-coordinates, in the map. Upon determining, from the map, that a planned path intersects a location, the vehicle computer 110 can predict a future vehicle operation mode for the location based on determining a previous user input selecting a corresponding vehicle operation mode for the location.

A planned path is a set of points, e.g., that can be specified as geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \tag{1}$$

where $a_0$ an offset, i.e., a lateral distance between the path and a center line of the host vehicle 105 at the upcoming distance x, $a_1$ is a heading angle of the path, $a_2$ is the curvature of the path, and $a_3$ is the curvature rate of the path.

The vehicle computer 110 is programmed to monitor the vehicle network to detect a fault condition, as discussed below. Upon detecting the fault condition, the vehicle computer 110 can store the detected fault condition, e.g., in the memory of the vehicle computer 110. In this context, a fault condition is a condition of a vehicle component 125 that impairs operation and/or gives rise to repair and/or maintenance needs. A fault condition can include a defect or degradation of the vehicle component 125. That is, the fault condition indicates a detection that the component 125 is not operating within one or more specified parameters. A fault condition can be specified according to a Diagnostic Trouble Code (DTC), OBD-II Trouble Code, or the like.

For example, the vehicle computer 110 can receive, via the vehicle network, one or more fault conditions from one or more electronic control units (ECUs). An ECU is a device including a processor and a memory that includes programming to control one or more vehicle components 125. The ECU can communicate with the vehicle computer 110 and other ECUs over the vehicle network.

In general, the ECU(s) can perform a conventional self-diagnostic test to detect fault conditions in the vehicle components 125 and/or to confirm that the vehicle components 125 are operating within the specified parameters. Typically, to perform a diagnostic test, the ECU receives diagnostic data from one or more sensors 115 monitoring the vehicle components 125. The ECU then determines whether the component 125 is capable of operation based on comparing the diagnostic data to the specified parameters. If the diagnostic data is outside the specified parameters, then the ECU determines and outputs a fault condition. That is, if the ECU determines a fault condition in the vehicle component(s) 125, the diagnostic data indicates that the vehicle component(s) 125 require(s) repair or replacement. The ECU can then provide the fault condition to the vehicle computer 110, e.g., via the vehicle network.

Upon detecting a fault condition, the vehicle computer 110 can identify the fault condition as one of persistent or transient. A persistent fault condition is a fault condition that cannot be resolved upon cycling power to the associated vehicle component 125 and/or ECU, e.g., by shutting the vehicle 105 off and turning the vehicle 105 back on. A transient fault condition is a fault condition that may be resolved upon cycling power to the associated vehicle component 125 and/or ECU. To resolve the fault condition means that the condition that initiated the fault condition is no longer present. For example, if a door is opened when the vehicle 105 cycles power, i.e., turns off then back on, the vehicle computer 110 may determine a fault condition of the door being ajar. The fault condition may be resolved by closing the door while the vehicle 105 is off and then turning the vehicle 105 back on. In such an example, the respective ECU may determine no fault conditions for the door when the vehicle 105 is on, e.g., via a subsequent diagnostic test. As another example, a transient fault condition may be resolved upon determining that a time elapsed from detecting the fault condition exceeds a time period.

The vehicle computer 110 can identify the fault condition as transient or persistent based on a look-up table or the like, e.g., stored in a memory of the vehicle computer 110. The look-up table may associate various fault conditions with either persistent or transient fault conditions. The vehicle computer 110 can, for example, access the look-up table and determine the detected fault condition is a persistent or transient fault condition based on a stored fault condition matching the detected fault condition. Upon identifying the fault condition, the vehicle computer 110 can store the fault condition, e.g., in the memory of the vehicle computer 110.

The vehicle computer 110 can receive a first database from the remote server computer 140, e.g., via the network 135. The first database may associate various fault conditions with a corresponding fault condition importance. A fault condition importance specifies a significance of impairment to vehicle 105 operation indicated by the fault condition. A fault condition importance is embodied as a number, typically an integer, e.g., on a scale from 1 to 10, inclusive, that corresponds to the significance of impairment to vehicle 105 operation. For example, a fault condition importance of 10 may indicate a higher significance of impairment than a fault condition importance of 1. The fault condition importance may be specified by a vehicle and/or component manufacturer, e.g., based on the vehicle components 125 and/or operations associated with the detected fault conditions. For example, a fault condition importance may be determined based on an amount of time the vehicle 105 is permitted to operate after detecting corresponding fault conditions. In such an example, the fault condition importance may be inversely related to the amount of time the vehicle 105 is permitted to operate after detecting the corresponding fault condition. That is, a relatively higher fault condition importance corresponds to a relatively lower amount of time the vehicle 105 is permitted to operate after detecting the corresponding fault condition. For example, the vehicle 105 may be permitted to operate for a greater amount of time upon detecting a fault condition in ambient lighting inside a passenger cabin as compared to detecting a fault condition in a brake component 125. In such an example, the fault condition importance, e.g., 10, of the fault condition in the brake component 125 may specify to a relatively higher significance of impairment, than the fault condition importance, e.g., 1, of the fault condition in the ambient lighting.

Upon identifying the fault conditions and determining the fault condition importance for the detected fault conditions, the vehicle computer 110 can generate a second database. The second database includes the detected fault conditions, the fault condition importance, and the identification of the detected fault conditions. The vehicle computer 110 can store the second database, e.g., in a memory of the vehicle computer 110. The vehicle computer 110 can remove one or more detected fault conditions from the second database based on, e.g., determining that a time elapsed from detecting the fault condition exceeds a time period or receiving a user input specifying to remove the detected fault condition.

The vehicle computer 110 then inputs the second database, as well as the vehicle environment conditions, and the vehicle operation mode, including the predicted future operation mode, into a neural network, such as a Deep Neural Network (DNN) (See FIG. 2) that can be trained to accept detected fault conditions, environment conditions, and a vehicle operation mode as input and generate an output identifying rankings for the detected fault conditions. The vehicle computer 110 can update the second database to include the rankings of the detected fault conditions. Additionally, the vehicle computer 110 can provide the second database, including rankings of the detected fault conditions, to the remote server computer 140, e.g., via the network 135. The rankings are integers, e.g., 1, 2, 3, etc., that represent a prioritization of the fault conditions relative to each other. For example, a first ranking having a smaller numerical value than a second ranking may be prioritized over the second ranking.

Additionally, upon detecting the fault conditions, the vehicle computer 110 is programmed to initiate a timer. The duration of the timer may be a predetermined time, e.g., specified by a vehicle and/or component manufacturer. The predetermined time may be specified such that the vehicle computer 110 can operate the vehicle 105 based on the rankings of the detected fault conditions prior to the vehicle computer 110 detecting updated fault conditions via the vehicle network. That is, the predetermined time is less than an amount of time for the ECUs to detect updated fault conditions via subsequent diagnostic checks and to provide the updated fault conditions to the vehicle computer 110. If the vehicle computer 110 receives the rankings from the neural network prior to expiration of the timer, then the vehicle computer 110 operates the vehicle 105 based on the rankings, as discussed further below.

If the vehicle computer 110 receives the rankings from the neural network after the timer expires, the vehicle computer 110 is programmed to then monitor the vehicle network to detect updated fault conditions. For example, the ECU(s) can determine an updated fault condition via a second diagnostic test and output the updated fault condition to the vehicle computer 110, e.g., via the vehicle network, in substantially the same manner as discussed above. The vehicle computer 110 can then identify the updated fault condition in substantially the same manner as discussed above. Additionally, the vehicle computer 110 can determine the fault condition importance corresponding with the updated fault condition in substantially the same manner as discussed above. The vehicle computer 110 can then update the second database to include the updated fault conditions. Upon updating the second database, the vehicle computer 110 can input the second database, the vehicle environment conditions, and the vehicle operation mode into the neural network to receive rankings of the updated fault conditions.

The vehicle computer 110 is programmed to operate the vehicle 105 based on the rankings of the fault conditions. As set forth above, neural network generates the rankings of the fault conditions as output based on receiving the detected fault conditions, the identification of the detected fault conditions, the fault condition importance of the detected fault conditions, environment conditions, and a vehicle operation mode as input. That is, the vehicle computer 110 can actuate one or more vehicle components 125 to operate the vehicle 105 based on the rankings of the fault conditions. The vehicle computer 110 can operate the vehicle 105 based on a highest ranked fault condition. For example, a highest ranked fault condition may be ranked higher than other fault conditions based on the other fault conditions being triggered by the presence of the highest ranked fault condition. Upon resolving the highest ranked fault condition, the vehicle computer 110 can remove the highest ranked fault condition from the second database while maintaining the subsequently ranked fault conditions in the second database. The vehicle computer 110 can then operate the vehicle 105 based on the subsequently ranked fault conditions. In this context, a highest ranked fault condition is a fault condition that is given priority over the other ranked fault conditions. For example, the vehicle computer 110 can operate the vehicle 105 to maintain vehicle 105 operation based on identifying the highest ranked fault condition as a transient fault condition. Additionally, the vehicle computer 110 can operate the vehicle 105 to perform a minimal risk maneuver based on identifying the highest ranked fault condition as a persistent fault condition. In such an example, the vehicle computer 110 can actuate one or more vehicle components 125 to perform the minimal risk maneuver. For example, the vehicle computer 110 can provide the highest ranked fault condition to one or more ECUs that control vehicle components 125 associated with the minimal risk maneuver.

As another example, the vehicle computer 110 can access a look-up table that corresponds various fault conditions with either maintaining vehicle 105 operation or performing a minimal risk maneuver. In such an example, the vehicle computer 110 can maintain vehicle operation 105 based on the highest ranked fault condition matching a fault condition stored in the look-up table corresponding with maintaining vehicle 105 operation. Additionally, the vehicle computer 110 can perform a minimal risk maneuver based on the highest ranked fault condition matching a fault condition stored in the look-up table corresponding with the minimal risk maneuver. The look-up table may be stored, e.g., in a memory of the vehicle computer 110.

A minimal risk maneuver is a set of autonomous operations that puts the vehicle 105 in a minimal risk condition. For purposes of this disclosure, "minimal risk condition" has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, *Automated Driving Systems 2.0: A Vision for Safety*, at 26 (citing SAE International J3016, International Taxonomy and Definitions for Terms Related to Driving Automation Systems for On-Road Motor Vehicles (J3016:September 2016)).) For example, the minimal risk maneuver may be initiating a handover to the human driver or autonomously driving the vehicle 105 to a halt at a roadside, i.e., stopping the vehicle 105 outside active lanes of traffic. The vehicle computer 110 may perform the minimal risk condition by using known autonomous-operation algorithms to instruct the vehicle components 125, e.g., a propulsion component, a brake component, a steering component, etc.

Figure 2:
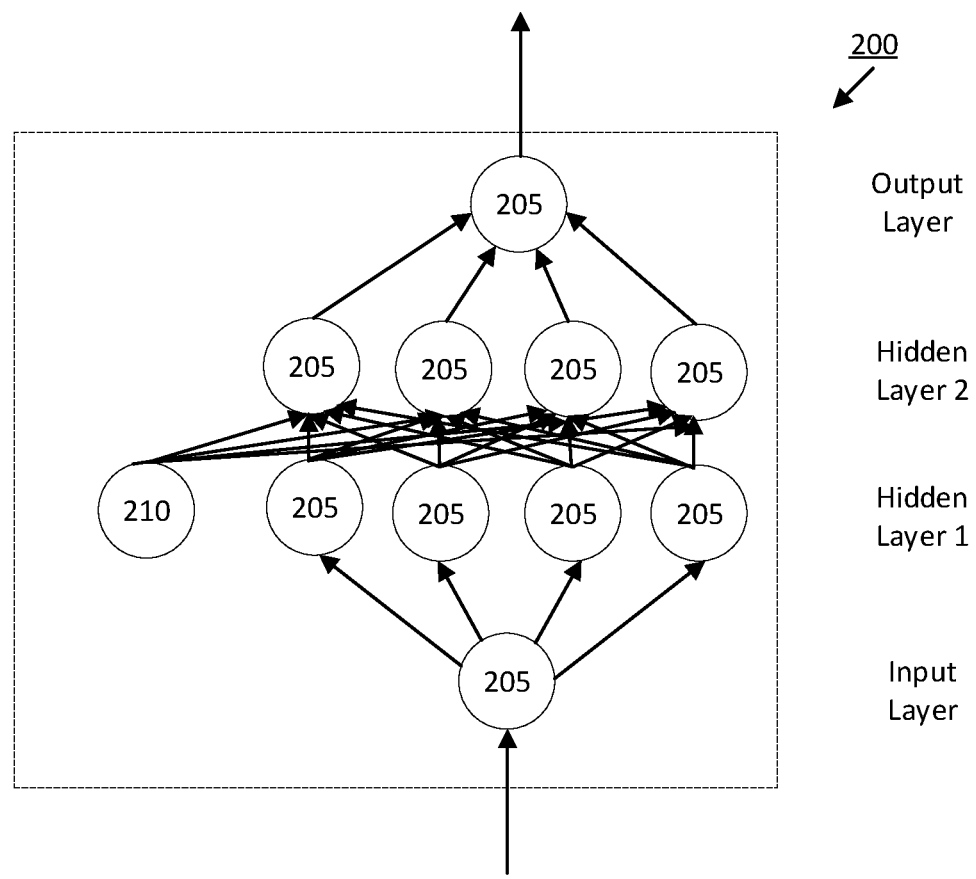
FIG. 2 is an example diagram of a deep neural network.

FIG. 2 is a diagram of an example deep neural network (DNN) 200 that can be trained to output rankings for detected fault conditions based on the detected fault conditions, environment conditions, and a vehicle operation mode. The DNN 200 can be a software program that can be loaded in memory and executed by a processor included in a computer, for example. In an example implementation, the DNN 200 can include, but is not limited to, a convolutional neural network (CNN), R-CNN (Region-based CNN), Fast R-CNN, and Faster R-CNN. The DNN includes multiple nodes, and the nodes are arranged so that the DNN 200 includes an input layer, one or more hidden layers, and an output layer. Each layer of the DNN 200 can include a plurality of nodes 205. While FIG. 2 illustrate two hidden layers, it is understood that the DNN 200 can include additional or fewer hidden layers. Additionally, bias neurons (as discussed below) can be included in at least some of the hidden layers. The input and output layers may also include more than one node 205.

The nodes 205 are sometimes referred to as artificial neurons 205, because they are designed to emulate biological, e.g., human, neurons. A set of inputs (represented by the arrows) to each neuron 205 are each multiplied by respective weights. The weighted inputs can then be summed in an input function to provide, possibly adjusted by a bias, a net input. The net input can then be provided to activation function, which in turn provides a connected neuron 205 an output. The activation function can be a variety of suitable functions, typically selected based on empirical analysis. As illustrated by the arrows in FIG. 2, neuron 205 outputs can then be provided for inclusion in a set of inputs to one or more neurons 205 in a next layer.

The DNN 200 includes first hidden layers and second hidden layers. The first hidden layers process the input data, i.e., the detected fault conditions, the environment conditions, and the vehicle operation mode, to output latent variables. The first hidden layers can include bias neurons 210. Bias neurons 210 adjust the input function of the nodes 205 in the first hidden layers by applying a specified bias to the input function that shifts the net input. The net input can then be provided to activation function, which in turn provides a connected neuron 205 the latent variables. The latent variables are then input into the second hidden layers.

The second hidden layers process the latent variables to output the rankings of the detected fault conditions. The second hidden layers can include bias neurons 210 that adjust the input function of the nodes 205 in the second hidden layers by applying a specified bias to the input function that shifts the net input. The net input can then be provided to the activation function, which in turn provides a connected neuron 205 the rankings of the detected fault condition.

The DNN 200 can be trained by processing a dataset that includes a plurality of fault conditions and a plurality of scores in a plurality of environmental conditions and vehicle operation modes. The scores are typically integers, e.g., 1, 5, 10, etc., that represent a severity of the detected fault condition based on the environmental conditions and the vehicle operation mode. Each fault condition in the dataset has corresponding ground truth that specifies a score of the detected fault condition in the corresponding environmental conditions and vehicle operation mode. Ground truth is data regarding a training dataset that is determined by a process independent from the deep neural network. Ground truth is deemed to represent a measurement of the real world. For example, a ground truth ranking can be specified by manual generation of a database including the score corresponding to a fault condition in respective environmental conditions and a respective vehicle operation mode. Backpropagation can compute a loss function based on the score and corresponding ground truth. A loss function is a mathematical function that maps a value such as a score into a real number that can be compared to the input ground truth to determine a cost during training. In this example, the cost can be determined as the difference between the determined score and the score in the corresponding ground truth. The loss function determines how closely the score matches the ground truth and is used to adjust the parameters or weights that control the DNN. The loss function is determined based on a maximum likelihood principle that determines a probability distribution that scores the detected fault conditions. A probability distribution is a mathematical function that gives the probabilities of occurrence of different possible scores for the detected fault conditions. The maximum likelihood principle is a technique of estimating parameters of the probability distribution to determine the parameters that correspond with the most probable scores of the detected fault conditions. That is, the maximum likelihood principle is a technique of obtaining the optimum parameters for the loss function.

Parameters controlling the DNN 200 processing are varied until output rankings match the ground truth for each of the plurality of training fault conditions in the training dataset. Parameters or weights include coefficients used by linear and/or non-linear equations included in fully-connected layers. Fully-connected layers process the latent variables output by other hidden layers. The DNN 200 can optimize parameters of the loss function by applying gradient descent to the loss function. Gradient descent calculates a gradient of the loss function with respect to the current parameters. The gradient indicates a direction and magnitude to move along the loss function to determine a new set of parameters. That is, the DNN 200 can determine a new set of parameters based on the gradient and the loss function. The DNN 200 can subsequently determine a new set of paraments in substantially the same manner until the DNN 200 identifies a local minimum of the loss function. In other words, the DNN 200 can continually apply gradient descent to the loss function until the DNN 200 determines the parameters that achieve a result that matches the ground truth, e.g., correspond to a gradient of zero with respect to the parameters.

Training a DNN typically includes systematically varying these parameters or weights and comparing the output results to a desired result corresponding to the ground truth. As a result of varying the parameters or weights over a plurality of trials over a plurality of input fault conditions, a set of parameters or weights that achieve a result that matches the ground truth can be determined. Applying gradient descent reduces an amount of time for training by using the loss function to identify specific adjustments to the parameters as opposed to selecting new parameters at random.

Upon determining the loss function, the DNN 200 then, e.g., using learning to rank techniques, ranks the detected fault conditions based on a scoring function. That is, the DNN 200 is a ranking DNN. The scoring function is a mathematical function that determines the probability of one detected fault condition being ranked higher than another detected fault condition. The scoring function is determined as a function of a difference between the scores of the detected fault conditions. The scoring function can be specified by manual input. The scoring function determines a weight for the difference between the scores that indicates how closely the fault conditions are ranked relative to each other. The DNN 200 can use the weight to adjust the rankings of the fault conditions. For example, the DNN 200 can push a first detected fault condition higher in the rankings than a second detected fault condition based on the weight for the first detected fault condition relative to a third detected fault condition being greater than a weight for the second detected fault condition relative to the third detected fault condition.

During operation, the vehicle computer 110 can detect a plurality of fault conditions and obtain sensor 115 data, including environment conditions and a vehicle operation mode (as discussed above), and provides the detected fault conditions and the sensor 115 data to the DNN 200. The DNN 200 outputs a prediction based on the received input. The DNN 200 output are predicted rankings of the detected fault conditions.

Figure 3:
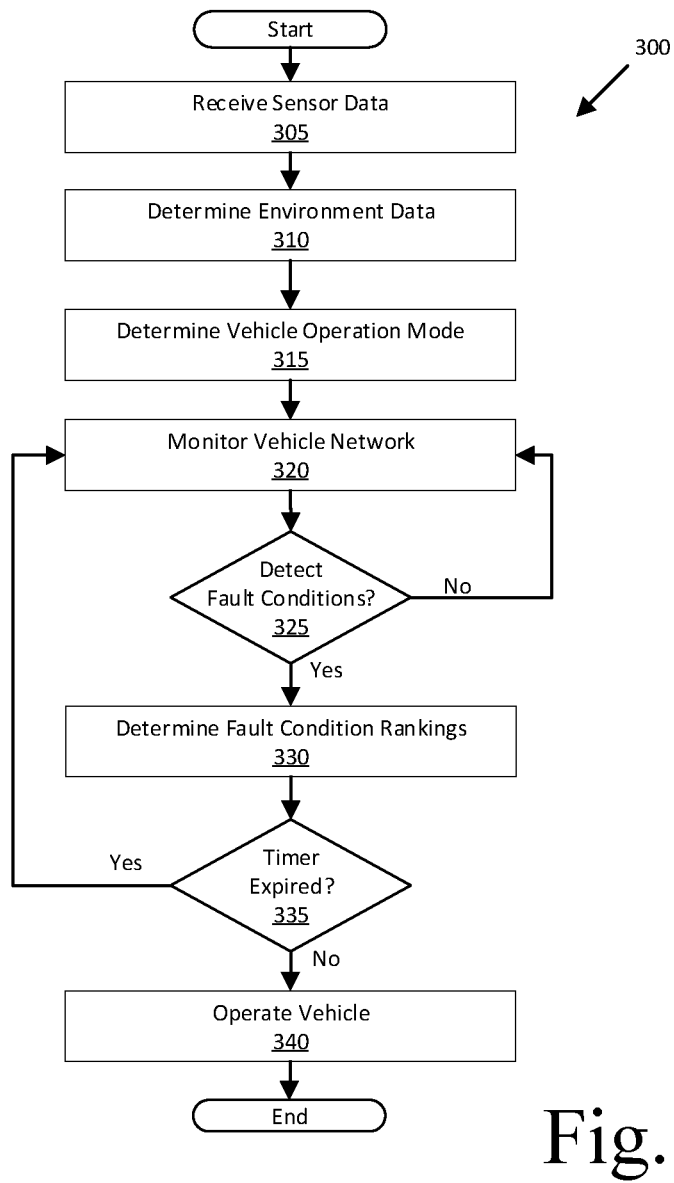
FIG. 3 is a flowchart of an example process for operating the vehicle.

FIG. 3 is a diagram of an example process 300 for operating the vehicle 105 based on rankings of detected fault conditions. The process 300 begins in a block 305. The process 300 can be carried out by a vehicle computer 110 included in the vehicle 105 executing program instructions stored in a memory thereof.

In the block 305, the vehicle computer 110 receives data from one or more sensors 115 and/or from a remote server computer 140. For example, the vehicle computer 110 can receive location data of the vehicle 105, e.g., from a sensor 115, a navigation system, etc. Additionally, the vehicle computer 110 can receive image data, e.g., from one or more image sensors 115. The image data may include data about the environment around the vehicle 105, e.g., one or more objects, another vehicle, pedestrians, etc. The process 300 continues in a block 310.

In the block 310, the vehicle computer 110 can determine the environment conditions around the vehicle 105 based on sensor 115 data and/or data received from the remote server computer 140. For example, the vehicle computer 110 can identify a current road of vehicle 105 operation based on the location of the vehicle 105, as discussed above. Upon identifying the current road, the vehicle computer 110 can determine road characteristics of the current road based on map data, e.g., received from the remote server computer 140, as discussed above. Additionally, the vehicle computer 110 can determine weather data for the environment around the vehicle 105. For example, the vehicle computer 110 can analyze image data, e.g., using image processing techniques, to determine the weather data, as discussed above. As another example, the vehicle computer 110 can receive weather data for the location from the remote server computer 140, e.g., via the network 135. The process 300 continues in a block 315.

In the block 315, the vehicle computer 110 determines a vehicle operation mode. For example, the vehicle computer 110 can receive a user input, e.g., via an HMI, selecting the vehicle operation mode. As another example, the vehicle computer 110 can predict a future vehicle operation mode for the vehicle 105 based on analyzing a planned path of the vehicle 105, as discussed above. The process 300 continues in a block 320.

In the block 320, the vehicle computer 110 monitors the vehicle network to detect a fault condition. For example, the vehicle computer 110 can receive, via the vehicle network, one or more fault conditions from one or more ECUs. The ECUs can, for example, determine a fault condition via a diagnostic test, as discussed above. After completing the diagnostic test, the ECU can output a fault condition based on determining diagnostic data is outside specified parameters, or no fault conditions based on determining the diagnostic data is within the specified parameters. The ECU can then transmit a message to the vehicle computer 110, e.g., via the vehicle network, indicating a fault condition or no fault conditions. The process 300 continues in a block 330.

In the block 325, the vehicle computer 110 determines whether a fault condition was detected. Upon receiving a fault condition from the ECU, e.g., via the vehicle network, the vehicle computer 110 can identify the fault condition as one of transient or persistent, as discussed above. For example, the vehicle computer 110 can access a look-up table, e.g., stored in a memory of the vehicle computer 110. The look-up table may associate various fault conditions with either persistent or transient fault conditions. The vehicle computer 110 can identify the fault condition based on a stored fault condition in the look-up table matching the detected fault condition.

Additionally, the vehicle computer 110 can determine the fault condition importance of the detected fault condition. For example, the vehicle computer 110 can access a first database, e.g., stored in a memory of the vehicle computer 110. The first database may associate various fault conditions with a fault condition importance, as discussed above. The vehicle computer 110 can determine the fault condition importance based on a stored fault condition in the first database matching the detected fault condition. The vehicle computer 110 can then generate a second database including the detected fault conditions, a fault condition importance of the detected fault conditions, and an identification of the detected fault conditions. If the vehicle computer 110 receives a fault condition, then the process 300 continues in a block 330. Otherwise, the process 300 returns to the block 320.

In the block 330, the vehicle computer 110 determines rankings for the detected fault conditions. For example, the vehicle computer 110 can input the second database, the environment conditions, and the vehicle operation mode into a DNN 200. The DNN 200 can then output the rankings for the detected fault conditions, as discussed above. The process 300 continues in a block 335.

In the block 335, the vehicle computer 110 determines whether a timer has expired prior to receiving the rankings for the detected fault conditions from the DNN 200. For example, upon detecting the fault conditions, the vehicle computer 110 can initiate a timer. A duration of the timer is a predetermined time, e.g., specified such that the vehicle computer 110 can operate the vehicle 105 based on the rankings of the detected fault conditions prior to the vehicle computer 110 detecting updated fault conditions. If the vehicle computer 110 receives the rankings for the detected fault conditions after the timer expires, the process 300 returns to the block 320. If the vehicle computer 110 receives the rankings for the detected fault conditions prior to expiration of the timer, the process 300 continues in a block 340.

In the block 340, the vehicle computer 110 operates the vehicle 105 based on the rankings for the detected fault conditions. For example, the vehicle computer 110 can determine to maintain vehicle 105 operation based on a highest ranked fault condition, e.g., being a transient fault condition, as discussed above. Additionally, the vehicle computer 110 can operate the vehicle 105 to perform a minimal risk maneuver, e.g., operate the vehicle 105 to a stop, operate the vehicle 105 below a speed threshold, etc., based on the highest ranked fault condition, e.g., being a persistent fault condition, as discussed above. In such an example, the vehicle computer 110 can provide the highest ranked fault condition to one or more ECUs that control the vehicle component(s) 125 associated with the minimal risk maneuver.

As another example, the vehicle computer 110 can determine to maintain vehicle 105 operation or perform a minimal risk maneuver based on the highest ranked fault condition matching a stored fault condition in a look-up table that corresponds various fault conditions with either maintaining vehicle 105 operation or performing a minimal risk condition, as discussed above. After operating the vehicle 105 based on the highest ranked fault condition, the vehicle computer 110 can operate the vehicle 105 based on subsequently ranked fault conditions. The process 300 ends following the block 340.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   detect, on a communication network onboard a vehicle, a plurality of fault conditions;
   input the detected fault conditions, a fault condition importance, environment conditions, and a vehicle operation mode to a neural network that outputs rankings for respective detected fault conditions, wherein the neural network is trained by determining a loss function based on a maximum likelihood principle that determines a probability distribution that ranks the detected fault conditions; and
   operate the vehicle based on the rankings of the fault conditions.

2. The system of claim 1, wherein environment conditions include at least one of road data or weather data.

3. The system of claim 1, wherein the fault condition importance is determined based on an amount of time the vehicle is permitted to operate after detecting corresponding fault conditions.

4. The system of claim 1, wherein the neural network includes first hidden layers that output latent variables to second hidden layers that output rankings for the detected fault conditions.

5. The system of claim 4, wherein the first hidden layers include bias neurons.

6. The system of claim 1, wherein the neural network optimizes parameters of the loss function by applying gradient descent to the loss function.

7. The system of claim 1, wherein the instructions further include instructions to operate the vehicle based further on identifying a highest ranked fault condition as one of persistent or transient.

8. The system of claim 1, wherein the instructions further include instructions to, upon determining an amount of time between detecting the fault conditions and receiving the output from the neural network is greater than or equal to a threshold, monitor the communications network onboard the vehicle for updated fault conditions and maintain operation of the vehicle.

9. The system of claim 8, wherein the instructions further include instructions to, upon detecting updated fault conditions, input the updated fault conditions into the neural network that outputs a ranking for the updated fault condition.

10. The system of claim 1, wherein the instructions further include instructions to operate the vehicle based further on determining an amount of time between detecting the fault conditions and receiving the output from the neural network is less than a threshold.

11. The system of claim 1, wherein instructions further include instructions to determine the vehicle operation mode based on vehicle sensor data.

12. The system of claim 1, wherein the instructions further include instructions to determine the environment conditions based on vehicle sensor data.

13. The system of claim 1, wherein the instructions further include instructions to access a look-up table to determine the fault condition importance.

14. The system of claim 1, wherein the instructions further include instructions to, based on identifying a highest ranked fault condition, one of maintain operation of the vehicle or perform a minimal risk maneuver.

15. A method, comprising:
detecting, on a communication network onboard a vehicle, a plurality of fault conditions;
inputting the detected fault conditions, a fault condition importance, environment conditions, and a vehicle operation mode to a neural network that outputs rankings for respective detected fault conditions, wherein the neural network is trained by determining a loss function based on a maximum likelihood principle that determines a probability distribution that ranks the detected fault conditions; and
operating the vehicle based on the rankings of the fault conditions.

16. The method of claim 15, wherein the neural network optimizes parameters of the loss function by applying gradient descent to the loss function.

17. The method of claim 15, further comprising operating the vehicle based further on determining an amount of time between detecting the fault conditions and receiving the output from the neural network is less than a threshold.

18. The method of claim 15, further comprising, based on identifying a highest ranked fault condition, one of maintaining operation of the vehicle or performing a minimal risk maneuver.

19. The method of claim 15, further comprising operating the vehicle based further on identifying a highest ranked fault condition as one of persistent or transient.

20. The method of claim 15, wherein the fault condition importance is determined based on an amount of time the vehicle is permitted to operate after detecting corresponding fault conditions.

* * * * *